(12) United States Patent
Kaufman et al.

(10) Patent No.: US 6,660,358 B2
(45) Date of Patent: Dec. 9, 2003

(54) GLOW-IN-THE-DARK FOOD AND BEVERAGE CONTAINERS

(75) Inventors: Richard H. Kaufman, New Castle, NY (US); Thomas K. Preston, Nanuet, NY (US); Marshall M. Rankowitz, Ridgefield, CT (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 10/123,352

(22) Filed: Apr. 16, 2002

(65) Prior Publication Data

US 2003/0194519 A1 Oct. 16, 2003

(51) Int. Cl.⁷ .............................. B44C 1/26; B44C 1/28; B44C 3/12; F21K 2/00; F21V 33/00
(52) U.S. Cl. .................. 428/67; 428/690; 428/913; 428/35.7; 428/500; 250/462.1; 362/101; 362/562; 362/582
(58) Field of Search .................. 428/67, 688, 689, 428/690, 913, 36.9, 35.7, 500; 250/462.1; 362/101, 154, 582, 562, 565

(56) References Cited

U.S. PATENT DOCUMENTS

| | | |
|---|---|---|
| 4,629,583 A | 12/1986 | Goguen |
| 4,640,797 A | 2/1987 | Goguen |
| 4,725,316 A | 2/1988 | Mahnay, II |
| 4,759,453 A * | 7/1988 | Paetzold ............... 215/11.1 |
| 4,943,896 A | 7/1990 | Johnson |
| 5,116,533 A | 5/1992 | Grandmont et al. |
| 5,498,280 A | 3/1996 | Fistner et al. |
| 5,607,621 A | 3/1997 | Isihara et al. |
| 5,692,895 A | 12/1997 | Farzin-Nia et al. |
| 5,698,301 A | 12/1997 | Yonetani |
| 5,811,174 A | 9/1998 | Murakami |
| 6,082,349 A | 7/2000 | Cheng et al. |
| 6,118,096 A | 9/2000 | Feng et al. |
| 6,168,853 B1 | 1/2001 | Feng et al. |
| 6,207,077 B1 | 3/2001 | Burnell-Jones |
| 6,298,841 B1 | 10/2001 | Cheng et al. |
| 6,474,467 B1 * | 11/2002 | Kurdian ............... 206/222 |
| 2003/0076673 A1 * | 4/2003 | Diak-Ghanem ........... 362/101 |

FOREIGN PATENT DOCUMENTS

GB  1 352 994  *  4/1971  .......... A47G/19/22

\* cited by examiner

*Primary Examiner*—Sandra M. Nolan
*Assistant Examiner*—Michael C. Miggins
(74) *Attorney, Agent, or Firm*—Fitch, Even, Tabin & Flannery

(57) ABSTRACT

A blow-molded, luminescent, polyethylene food or beverage container or bottle which glows-in-the dark due to the presence of zinc sulfide luminescent pigment in the polyethylene resin at a level of from about 0.075 to about 1.2 percent by weight. The blow-molded, luminescent, polyethylene beverage container or bottle is designed to contain an acidic beverage. Even after prolonged storage in the container or bottle, the acidic beverage contains less than 0.25 ppm of zinc.

20 Claims, No Drawings

GLOW-IN-THE-DARK FOOD AND BEVERAGE CONTAINERS

FIELD OF THE INVENTION

This invention relates to glow-in-the-dark food and beverage containers which are suitable for use with and storage of beverages, including acidic beverages. Even more specifically, this invention relates to a blow-molded, luminescent, polyethylene beverage container or bottle which glows-in-the dark due to the presence of zinc sulfide luminescent pigment in the polyethylene resin at a level of about 0.075 to about 1.2 percent by weight. Blow-molded, luminescent, polyethylene beverage containers or bottles especially designed to contain an acidic beverage are provided. Even after prolonged storage in the container or bottle, such an acidic beverage contains less than about 0.25 ppm of zinc.

BACKGROUND OF THE INVENTION

There has been a recent trend to package ready-to-drink beverages intended for young consumers in containers which also provide a level of entertainment. Plastic beverage bottles have been adorned with surface ornamentation including a series of collectible caricatures. These plastic bottles may, after the beverage is consumed, be used as bowling pins or be refilled with water and used as a type of squirt gun.

Other functional items intended for use by children have also attempted to supply entertaining and/or attractive features which will heighten their appeal to children. For instance, phosphorescent pigments have been incorporated into the plastic resin used to form handles for children's toothbrushes. These handles will then glow-in-the dark and presumably encourage a child to adopt recommended dental hygiene practices. Plastic drinking cups, dental retainers, and baby pacifiers have also been known to incorporate phosphorescent pigments. The use of phosphorescent pigments in plastic food storage containers intended for prolonged storage (i.e., where the food product remains in contact with the storage container for periods greater than, for example, 10 weeks or more prior to consumption) has apparently not been considered.

SUMMARY OF THE INVENTION

Glow-in-the-dark food and beverage containers which are suitable for use with and storage of beverages, including acidic beverages, are provided. Even more specifically, this invention provides blow-molded, luminescent, polyethylene beverage containers or bottles which glow-in-the dark due to the presence of zinc sulfide luminescent pigment in the polyethylene resin at a level of about 0.075 to about 1.2 percent by weight. Blow-molded, luminescent, polyethylene beverage containers or bottles especially designed to contain an acidic beverage are provided. Even after prolonged storage in the container or bottle, such an acidic beverage contains less than about 0.25 ppm of zinc.

DETAILED DESCRIPTION OF THE INVENTION

Pigments capable of producing luminescence are known and commercially available. In general, these pigments are produced by calcining zinc sulfide in the presence of an activating element and flux at furnace temperatures. Typically, zinc sulfide in calcined above 1,000° C. and thereafter allowed to cool in air to develop luminescence. The resulting crystals are then screened, filtered, vacuum dried and washed prior to final drying.

Zinc sulfide may be activated with such metals as silver, copper, manganese or cerium, with copper being preferred as it produces the most persistent pigment and has a yellow-green color. Usually the pigments are surface coated with compounds, such as potassium or calcium silicate, to prevent deterioration.

As is common with pigments for use in coloring molded resin articles, the dried pigment is dispersed in an amount of the resin (e.g., polyethylene) which is used to make the molded article. A slip agent, such as zinc stearate, and any desired color enhancer (e.g., lithopone, a white pigment consisting of a mixture of zinc sulfide, barium sulfate and some zinc oxide) may also be dispersed in the resin which is then extruded and pelletized into a form suitable for use in commercial molding operations.

Containers, such as bottles, which are used to store, acidic, ready-to-drink beverages are typically blow-molded from polyethylene resin. These resins may be of either the high-density or low-density type. These beverages, which usually are fruit-flavored, fruit juices or fruit drinks, will have pH of from about 2.5 to 3.5.

It has been found, according to this invention, that luminescent zinc sulfide pigments when incorporated into blow-molded, polyethylene food containers or bottles at a level of from 0.75 to 1.2 percent, preferably from 0.85 to 1.0 percent by weight of the bottle, serve to provide a desirable level of luminescence to the bottle and keep the level of migration of zinc from the bottle into the food product or beverage to below 0.25 ppm for storage times as long as ten weeks at 110° F. This level of 0.25 ppm is the detection limit of the analytical instrument (i.e., atomic absorption spectrophotometer; see Example) used to measure zinc content; no zinc was detected even after storage at 110° F. for ten weeks. The actual level of zinc migration is believed to be less than 0.10 ppm and on the order of 50 ppb. These levels are well below the level which would prompt any governmental agency concern of regulation. Any negligible zinc migration into the food product or beverage has no effect on the amount of luminescence produced by the bottle.

The use of the luminescent zinc sulfide pigment in blow-molded, polyethylene bottles at the preferred level of 0.85 to 1.0 percent by weight will produce a level of luminescence which is appealing to children. Specifically, in a dimly lit room, the bottle will have a faint, noticeable glow and in a dark room, the bottle will be readily visible. The amount of luminescence has been quantified via measurement with a Minolta Luminance meter Model LS-100 to be at least 0.010 candles/$m^2$(cd/$m^2$) compared to the 0.001 reading of the dark space around the bottles in a dark environment. Although the food containers of this invention are especially appealing to children, they are not limit to foods and/or beverages intended for consumption by children only.

EXAMPLE

A pigmented resin composition was produced by mixing 98.5 parts of low-density polyethylene pellets with 1.5 parts of pigmented pellets. The pigmented pellets were comprised of 60 percent luminescent zinc sulfide pigment, 36.9 percent low-density polyethylene, 2.22 percent zinc stearate, and 0.88 percent lithopone. The resin composition was fed to an extrusion blow-molder which produced single service beverage bottles each weighing 16 grams and having an internal volume of 208 ml. Each bottle was filled with 198 ml (208.5 g) of a fruit-flavored beverage having a pH of 2.8 and sealed. Samples of these bottles were stored at 30° F., 0% relative humidity (R.H.); 70° F., 30% R.H.; 90° F., 70% R.H.; and 110° F., 70% R.H. In all cases, after ten weeks of storage, zinc levels in the beverage were below the detection limit achievable with the Perkin-Elmer 5000ä atomic absorption spectrophotometer (with impact bead) utilized for this analysis; the detection limit under these conditions was 0.25 ppm. The luminescence for the bottles was found to be 0.013 cd/m² when measured in accordance with procedure described above.

Having described the invention what is claimed is:

1. A luminescent container for long-term storage of a food product, said container being formed from a pigmented, polyethylene resin containing about 0.075 to about 1.2 percent by weight of a luminescent zinc sulfide pigment, wherein the container has a level of luminescence in excess of about 0.010 cd/m² and wherein the food product, after ten weeks of storage in the container at 110° F., contains less than about 0.25 ppm of zinc.

2. The container of claim 1, wherein the pigmented, polyethylene resin contains about 0.85 to about 1.0 percent by weight of the luminescent zinc sulfide pigment.

3. The container of claim 1, wherein the food product contains less than 0.10 ppm of zinc after the ten weeks of storage.

4. The container of claim 3, wherein the pigmented, polyethylene resin contains about 0.85 to about 1.0 percent by weight of the luminescent zinc sulfide pigment.

5. The container of claim 1, wherein the food product is an acidic, fruit-flavored beverage.

6. The container of claim 5, wherein the food product has a pH of from about 2.5 to about 3.5.

7. The container of claim 5, wherein the pigmented, polyethylene resin contains about 0.85 to about 1.0 percent by weight of the luminescent zinc sulfide pigment.

8. The container of claim 7, wherein the food product has a pH of from about 2.5 to about 3.5.

9. The container of claim 5, wherein the food product contains less than 0.10 ppm of zinc after the ten weeks of storage.

10. The container of claim 9, wherein the food product has a pH of from about 2.5 to about 3.5.

11. The container of claim 9, wherein the pigmented, polyethylene resin contains about 0.85 to about 1.0 percent by weight of the luminescent zinc sulfide pigment.

12. The container of claim 11, wherein the food product has a pH of from about 2.5 to about 3.5.

13. A blow-molded, luminescent container for long-term storage of an acidic, fruit-flavored beverage food product, said container being formed from a pigmented, polyethylene resin containing about 0.075 to about 1.2 percent by weight of a luminescent zinc sulfide pigment, wherein the container has a level of luminescence in excess of about 0.010 cd/m² and wherein the beverage, after ten weeks of storage in the container at 110° F., contains less than about 0.25 ppm of zinc.

14. The container of claim 13, wherein the beverage has a pH of from about 2.5 to about 3.5.

15. The container of claim 13, wherein the pigmented, polyethylene resin contains about 0.85 to about 1.0 percent by weight of the luminescent zinc sulfide pigment.

16. The container of claim 15, wherein the beverage has a pH of from about 2.5 to about 3.5.

17. The container of claim 13, wherein the beverage contains less than 0.10 ppm of zinc after the ten weeks of storage.

18. The container of claim 17, wherein the beverage has a pH of from about 2.5 to about 3.5.

19. The container of claim 17, wherein the pigmented, polyethylene resin contains about 0.85 to about 1.0 percent by weight of the luminescent zinc sulfide pigment.

20. The container of claim 19, wherein the beverage has a pH of from about 2.5 to about 3.5.

* * * * *

UNITED STATES PATENT AND TRADEMARK OFFICE
CERTIFICATE OF CORRECTION

PATENT NO. : 6,660,358 B2
DATED : December 9, 2003
INVENTOR(S) : Kaufman et al.

It is certified that error appears in the above-identified patent and that said Letters Patent is hereby corrected as shown below:

Column 3,
Line 13, before "luminescent", insert -- long– term storage --.
Line 13, delete "for long-term storage of", insert -- containing --.

Column 4,
Lines 11-12, after "molded", insert -- long-term storage --.
Line 12, delete "for long-term storage of", insert -- containing --.

Signed and Sealed this

Sixth Day of April, 2004

JON W. DUDAS
*Acting Director of the United States Patent and Trademark Office*